US012026619B1

(12) United States Patent
Berman et al.

(10) Patent No.: US 12,026,619 B1
(45) Date of Patent: Jul. 2, 2024

(54) SLIMMABLE NEURAL NETWORK ARCHITECTURE SEARCH OPTIMIZATION

(71) Applicant: Amazon Technologies, Inc., Seattle, WA (US)

(72) Inventors: Maxim Berman, Leuven (BE); Leonid Pishchulin, Seattle, WA (US); Ning Xu, Seattle, WA (US); Gerard Guy Medioni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 539 days.

(21) Appl. No.: 16/710,951

(22) Filed: Dec. 11, 2019

(51) Int. Cl.
*G06N 3/082* (2023.01)
*G06F 11/30* (2006.01)
*G06N 3/04* (2023.01)

(52) U.S. Cl.
CPC ......... *G06N 3/082* (2013.01); *G06F 11/3058* (2013.01); *G06N 3/04* (2013.01)

(58) Field of Classification Search
CPC ............... G06Q 10/087; G06Q 20/203; G06Q 30/0639; G06Q 10/08; G06Q 20/20; G06Q 20/208; G06Q 30/02; G06Q 10/00; G06Q 10/0875; G06Q 10/109; G06Q 20/18; G06Q 20/3226; G06Q 20/36; G06Q 20/40145; G06Q 30/00; G06Q 30/0261; G06Q 30/0269; G06Q 30/0281; G06Q 30/0282; G06Q 30/06; G06Q 30/0623; G06Q 30/0631; G06Q 30/0635; G06Q 30/0641; G06Q 99/00; G06Q 10/06395; G06Q 10/083; G06Q 10/0832; G06Q 10/08533; G06Q 20/32; G06Q 20/321; G06Q 20/322; G06Q 20/3224; G06Q 20/3267; G06Q 20/3276; G06Q 20/343; G06Q 20/384; G06Q 20/401; G06Q 30/0201; G06Q 30/0207; G06Q 30/0643; G06Q 40/08; G06Q 50/22; G06K 9/00; G06K 7/0008; G06K 9/00536; G06K 9/6201; G06K 19/06028; G06K 19/06037; G06K 19/0723; G06K 9/6232; G06K 9/6234; G06K 9/6254; G06K 9/6267; G06K 9/627; G06K 9/628; G06K 9/6287; G06K 9/6296;
(Continued)

(56) References Cited

U.S. PATENT DOCUMENTS 7,225,980 B2 6/2007 Ku et al.
7,949,568 B2 5/2011 Fano et al.
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Tahmina N Ansari
(74) *Attorney, Agent, or Firm* — Athorus, PLLC

(57) ABSTRACT

Disclosed are systems and methods to perform neural architecture search ("NAS") that automatically optimizes for the number of channels to allocate to each layer of a deep neural network. Some implementations include a pairwise slimming that includes a global optimization step. Likewise, in some implementations, a bias toward a region of interest may be applied to channel path selection during training.

20 Claims, 13 Drawing Sheets

(58) Field of Classification Search
CPC .. H04N 7/18; H04N 7/181; H04N 2013/0081; H04N 21/812; H04N 5/23203; H04N 5/23206; H04N 5/23219; H04N 5/23293; H04N 5/232933; H04N 7/183; H04N 13/239; H04N 13/243; H04N 13/257; H04N 5/262; G06V 20/52; G06V 10/10; G06V 10/147; G06V 10/42; G06V 10/462; G06V 10/62; G06V 10/82; G06V 20/10; G06V 20/41; G06V 20/53; G06V 20/64; G06V 40/70; G06F 1/3265; G06F 3/01; G06F 3/011; G06F 3/0482; G06F 9/542; G06F 1/00; G06F 1/1601; G06F 16/50; G06F 2200/161; G06F 3/002; G06F 9/06; G06F 9/44; G06T 19/006; G06T 2207/10012; G06T 2207/10016; G06T 2207/30232; G06T 7/246; G06T 7/73; G06T 1/20; G06T 7/20; G06T 7/285; G06T 7/80; G06N 3/0454; G06N 3/082; G06N 3/063; G06N 20/00; G06N 3/04; G06N 3/0472; G06N 3/0481; G06N 3/084; G06N 3/088

See application file for complete search history.

(56) References Cited

U.S. PATENT DOCUMENTS

| | | | |
|---|---|---|---|
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 10,909,457 | B2 * | 2/2021 | Tan .................. G06N 3/04 |
| 11,244,227 | B2 * | 2/2022 | Asai .................. G06N 3/088 |
| 2003/0002712 | A1 | 1/2003 | Steenburgh et al. |
| 2004/0181467 | A1 | 9/2004 | Raiyani et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0121017 | A1 | 5/2009 | Cato et al. |
| 2009/0245573 | A1 | 10/2009 | Saptharishi et al. |
| 2011/0011936 | A1 | 1/2011 | Morandi et al. |
| 2012/0284132 | A1 | 11/2012 | Kim et al. |
| 2013/0076898 | A1 | 3/2013 | Philippe et al. |
| 2013/0253700 | A1 | 9/2013 | Carson et al. |
| 2014/0279294 | A1 * | 9/2014 | Field-Darragh ... G06Q 30/0282 705/28 |
| 2014/0362223 | A1 | 12/2014 | LaCroix et al. |
| 2015/0019391 | A1 | 1/2015 | Kumar et al. |
| 2015/0073907 | A1 | 3/2015 | Purves et al. |
| 2020/0234130 | A1 * | 7/2020 | Yan .................. G06N 3/0454 |
| 2021/0209388 | A1 * | 7/2021 | Ciftci ............... G06V 10/764 |

OTHER PUBLICATIONS

Cai, H., et al. Proxylessnas: Direct Neural Architecture Search on Target Task and Hardware. ArXiv, abs/1812.00332, 2018, https://arxiv.org/pdf/1812.00332v1.pdf, 13 pages.

Cristian Pop, "Introduction to the BodyCom Technology", Microchip AN1391, May 2, 2011, pp. 1-24, vol. AN1391, No. DS01391A, Publisher: 2011 Microchip Technology Inc.

Diamond, S. and Boyd, S. Cvxpy: A Python-Embedded Modeling Language for Convex Optimization. Journal of Machine Learning Research, 17(83):1-5, 2016, http://web.stanford.edu/~boyd/papers/pdf/cvxpy_paper.pdf, 5 pages.

Han, D., et al. Deep Pyramidal Residual Networks. 2017 IEEE Conference on Computer Vision and Pattern Recognition (CVPR), http://openaccess.thecvf.com/content_cvpr_2017/papers/Han_Deep_Pyramidal_Residual_CVPR_2017_paper.pdf, 9 pages.

He, T., et al., Bag of Tricks For Image Classification With Convolutional Neural Networks. ArXiv, abs/1812.01187, 2018, https://arxiv.org/pdf/1812.01187v2.pdf, 10 pages.

Hinton, G., et al. Distilling the Knowledge in a Neural Network. arXiv preprint arXiv:1503.02531, 2015, https://arxiv.org/pdf/1503.02531.pdf, 9 pages.

Howard, A. G., et al. Mobilenets: Efficient Convolutional Neural Networks for Mobile Vision Applications. ArXiv, abs/1704.04861, 2017, https://arxiv.org/pdf/1704.04861.pdf, 9 pages.

Loshchilov, I. and Hutter, F. SGDR: Stochastic Gradient Descent with Restarts. ArXiv, abs/1608.03983, 2016, https://arxiv.org/pdf/1608.03983v2.pdf, 9 pages.

Mensch, A. and Blondel, M. Differentiable Dynamic Programming for Structured Prediction and Attention. In ICML, 2018, https://arxiv.org/pdf/1802.03676v2.pdf, 28 pages.

O'Donoghue, B., et al. Conic Optimization via Operator Splitting and Homogeneous Self-Dual Embedding. Journal of Optimization Theory and Applications, 169(3):1042-1068, 2016, https://web.stanford.edu/~boyd/papers/pdf/scs.pdf, 27 pages.

Paszke, A., et al. ENet: A Deep Neural Network Architecture for Real-Time Semantic Segmentation. ArXiv, abs/1606.02147, 2016, https://arxiv.org/pdf/1606.02147.pdf, 10 pages.

Sandler, M., et al. Mobilenetv2: Inverted Residuals and Linear Bottlenecks. 2018 IEEE/CVF Conference on Computer Vision and Pattern Recognition, pp. 4510-4520, 2018, http://openaccess.thecvf.com/content_cvpr_2018/papers/Sandler_MobileNetV2_Inverted_Residuals_CVPR_2018_paper.pdf, 11 pages.

Simonyan, K. and Zisserman, A. Very Deep Convolutional Networks for Large-Scale Image Recognition. CoRR, abs/1409.1556, 2014, https://arxiv.org/pdf/1409.1556v1.pdf, 10 pages.

Srivastava, S., et al. Adaptive Compression-based Lifelong Learning. In Proceedings of the British Machine Vision Conference (BMVC), 2019, https://bmvc2019.org/wp-content/uploads/papers/0649-paper.pdf, 13 pages.

Stamoulis, D., et al. Single-Path NAS: Device-Aware Efficient ConvNet Design. ArXiv, abs/1905.04159, 2019, https://arxiv.org/pdf/1905.04159.pdf, 4 pages.

Tan, M. and Le, Q. V. EfficientNet: Rethinking Model Scaling for Convolutional Neural Networks. In ICML, 2019, https://arxiv.org/pdf/1905.11946.pdf, 10 pages.

Viterbi, A. Error Bounds for Convolutional Codes and an Asymptotically Optimum Decoding Algorithm. IEEE Transactions on Information Theory, 13(2):260-269, 1967, http://www.essrl.wustl.edu/~jao/itrg/viterbi.pdf, 10 pages.

Xie, S., et al. Exploring Randomly Wired Neural Networks for Image Recognition. ArXiv, abs/1904.01569, 2019, https://arxiv.org/pdf/1904.01569.pdf, 10 pages.

Yang, T.-J., et al. NetAdapt: Platform-Aware Neural Network Adaptation for Mobile Applications. In ECCV, 2018, https://arxiv.org/pdf/1804.03230v1.pdf, 16 pages.

Yu, J. and Huang, T. AutoSlim: Towards One-Shot Architecture Search for Channel Nos. arXiv e-prints, p. arXiv:1903.11728, 2019, https://arxiv.org/pdf/1903.11728.pdf, 10 pages.

Yu, J. and Huang, T. Universally Slimmable Networks and Improved Training Techniques. ArXiv, abs/1903.05134, 2019, https://arxiv.org/pdf/1903.05134.pdf, 11 pages.

Yu, J., et al. Slimmable Neural Networks. ArXiv, abs/1812.08928, 2018, https://arxiv.org/pdf/1812.08928.pdf, 12 pages.

* cited by examiner

SLIMMABLE NEURAL NETWORK ARCHITECTURE SEARCH OPTIMIZATION

BACKGROUND

Designing the right neural network architecture to address a particular learning task is a crucial element of deep learning. In general, wider and deeper networks have more capacity than shallower ones, and generally yield a better performance. However, such networks require considerable computational resources, resulting both in large energy consumption for the device(s) executing the network, and a long latency that can be prohibitive for time-critical applications, such as real-time segmentation or video recognition.

Neural architecture search (NAS) approaches attempt to automatically find neural network architectures that fit low-resource computational constraints while maintaining a good performance on the target platform. Existing NAS approaches attempt to determine network architectures by, for example, considering a fixed neural network connectively graph and fixed operations and attempt to determine parameters for those operations that reduce the computation and latency of the network, without increasing error. One example is the determination of the kernel sizes, or of the number of input and output channels in the network. For example, AutoSlim, an existing NAS, searches for channel numbers to optimize.

However, even for a restricted search space, such as channel number optimization, the size of the search space is a significant challenge. For example, if a network N is parametrized by its channel numbers, the design space has an exponential size in the number of layers. In addition, evaluating the performance of a given network in a supervised learning setting requires first training the network on a training set, which typically requires hours or days of computation.

BRIEF DESCRIPTION OF DRAWINGS

The detailed description is described with reference to the accompanying figures.

DETAILED DESCRIPTION

Disclosed are systems and methods to perform neural architecture search ("NAS") that automatically optimizes for the number of channels to allocate to each layer of a deep neural network. Some implementations include a pairwise slimming that includes a global optimization step. For example, a total target runtime, also referred to herein as a latency target, may be determined based on the device upon which the network will operate. The latency target may be expressed as the sum of each layer of the network, which is dependent on the input and output channels of that layer in the search space. In some implementations, a pairwise Markov Random Fields ("MRF") modeling the performance of each path in the network may be used as an adaptive sampling scheme, allowing a gradual specialization of the training phase to fit the latency target.

During training, for each training epoch (one cycle through the full training dataset), the training data may be propagated through a different channel configuration path. For each layer and channel configuration, a rolling average of computed losses during each training iteration may be maintained. The error associated with a particular channel choice may then be assimilated with the rolling average of the losses that occur when the training data progresses through the channel choice. When training is complete, a particular path through the network is determined to have an error which is the sum of the individual channel errors through that path.

Still further, in some implementations, the network may be further optimized through dynamic selection of the best-performing path. For example, during training, channel configuration with high error and/or latency that is different from the latency target may be filtered out in order to yield a better proxy of the performance of a single network trained end-to-end with only one channel configuration.

Figure 1:
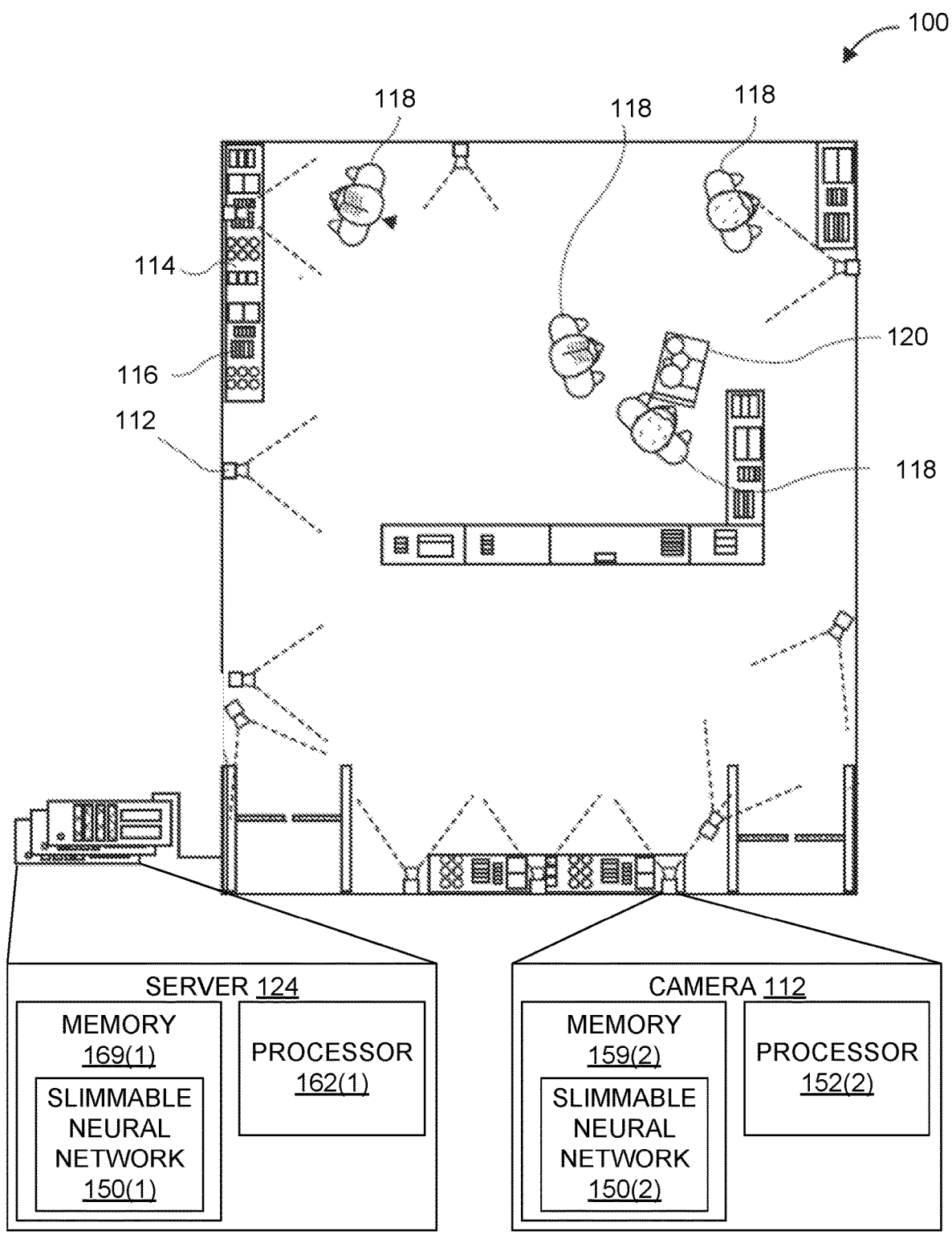
FIG. 1 illustrates a system that utilizes various devices, such as cameras, to obtain image information within a facility, in accordance with described implementations.

FIG. 1 illustrates a system 100 that utilizes various devices 112, such as cameras, to generate data within a facility, according to some implementations. For example, devices 112 may be positioned throughout the facility to obtain, for example, image data, depth data, sound data, etc., generally referred to herein as data. The obtained data may be processed to determine the location of users 118, the location of carts 120, inventory 116, etc., to determine actions occurring within the facility, to detect or identify items 116 and/or users 118 within the facility, etc. Actions may include, but are not limited to, a pick of an item 116 from an inventory location 114, a place of an item 116 to an inventory location, a place of an item 116 into a cart 120, a pick of an item 116 from a cart 120, etc. The various monitoring, detection, and identification that may be determined from obtained data is referred to herein generally as an output. As such, an output includes, but is not limited to, any action, event, identity, etc., that may be determined through processing of data collected from one or more devices.

As is known in the art, neural networks are often used to process collected data to determine one or more outputs. In some implementations, the data may be sent to one or more servers 124 for processing and determining the one or more outputs. The servers 124 may be communicatively connected to the devices, for example through a wired or wireless network. Likewise, the servers 124 may be local or remote from the facility. In other implementations, some or all of the data may be processed on the device 112 itself to determine the output.

As illustrated, a server 124 may include one or more processors 162(1) and a memory 169(1) that stores program instructions that when executed by the one or more processors 162(1) perform various tasks. For example, the memory 169 may maintain a neural network 150(1) that is trained to receive data from devices 112 and process the data to determine a desired output. For example, the data may include image data of a portion of the facility and the desired output may be a determination of an action performed by one or more users 118 represented in the image data. For illustration purposes, in some implementations, image data from a camera may include a representation of a user 118 performing an action of an item pick of an inventory item 116 from an inventory location 114. That image data may be provided by the camera (a device 112) to the server 124 and the neural network 150(1) executing on the server 124 may process the image data to determine that the performed action was an item pick. In other implementations, other outputs, such as user identity, item identity, etc., may be determined by the neural network 150(1) or other neural networks executing on the server 124.

In implementations in which the neural network 150 is executing on one or more servers 124, the constraints for processing power, speed, time, etc., may be less of a concern as several servers and/or large compute capacity may be available. In other implementations, it may be desirable to process data through a neural network in a resource constrained environment, such as a portable device, a camera, an imaging element, a depth sensor, etc. However, traditional neural networks typically require more computing capacity and/or memory than is available in such environments.

Recently, slimmable neural networks have been introduced that allow selective channel paths and the ability to reduce the width of the network, thereby reducing the memory footprint and computing requirements. Benefits of a slimmable neural network include training of a single model that can be benchmarked and deployed. The model may then be adjusted to enable or disable channels within the network to reduce the size of the model for operation in resource constrained environments.

Existing techniques for slimming the network, such as AutoSlim, use a greedy approach that iteratively removes channels from each layer of the network until the resource constraints are satisfied. Such a greedy approach treats all layers the same, removing channels from each layer until the constraint is achieved. However, such techniques ignore the differences between the layers and introduce additional error as each channel is removed.

As discussed further below, the disclosed implementations provide a technical improvement over existing slimming techniques through use of a global optimization procedure. Still further, in some implementations, biased sampling of channels within each layer may be utilized to further optimize the training process.

Returning to FIG. 1, the disclosed implementations may be utilized to slim the neural network 150 so that it may operate in a resource constrained environment, such as on a device 112. For example, device 112 may include a processor 152(2) and a memory 159(2) storing program instructions that when executed by the processor 159(2) cause the processor 159(2) to perform one or more tasks. For example, the memory 159(2) may include a neural network 150(2) that has been slimmed compared to the neural network 150(1) executing on the server 124, using one or more of the disclosed implementations, such that the neural network 150(2) can operate in the constrained environment of the device 112 and determine the output for which the network 150(2) was trained. The constrained environment of the device 112 may include, but is not limited to, less computing power available through the processor 152(2), less available memory 159(2), need for faster response time, etc. As will be appreciated, a device 112, such as a camera, may have less processing power, memory, etc., when compared to servers 124.

In some implementations, the neural network may be slimmed based on different constraints of different devices 112 within the facility and deployed to each device for execution. For example, the disclosed implementations may be used to slim the neural network to satisfy first constraints of a first device 112 and the network may be slimmed to satisfy second constraints of a second device 112.

Outputs from the various slimmed neural networks executing on the devices 112 within the facility, such as slimmed neural network 150(2), and/or outputs produced from neural networks 150(1) executing on the server 124, may be utilized for a variety of purposes. For example, actions may be associated with users located within the facility, information and/or assistance may be determined from the output and provided to users in the facility, etc. As one example, outputs from various slimmable neural networks in the facility that determine an action of an item pick of a first item by a first user may result in an item identifier corresponding to the first item being added to an item list associated with that user.

FIGS. 2A through 2E are block diagrams illustrating an example slimmable neural network slimmed using existing slimming techniques, such as AutoSlim.

As those skilled in the art will appreciate that, in a general discussion of machine learning, a neural network 200 often comprises multiple executable layers, including an input layer 201, an output layer 240, and one or more hidden layers, such as layer 1 210, layer 2 220, and layer 3 230. As will be appreciated, the network 200 may include fewer or additional layers. The input layer 201 accepts input data (e.g., image data, depth data) and determines an output that is provided from the output layer 240.

The input layer 201 accepts the input data and, according to one or more predetermined algorithms and/or heuristics embedded within the various layers of the neural network, generates an output for which the neural network was trained. For example, if the input is image data and the neural network was trained to identify items represented in the image data, the input image data is processed through each layer of the network and an output indicating an identity of an item represented in the image data is provided. In some implementations, the output may include a confidence value or score representative of a likelihood that the item has been accurately identified.

As is known, nodes or channels at each layer process input received at that layer and provide outputs to the next layer. For example, the input layer 201 processes the received data and generates outputs that are provided to channels 211, 212, 213, 214, 215, 216, 217, 218 of layer 1 210. The values output by channels of the various layers constitute at least some of the output of the layer and are distributed as input data or input values to channels of the next layer. For example, the outputs from channels 211 through 218 of layer 1 210 are provided to channels 221, 222, 223, 224, 225, 226, 227, and 228 of layer 2 220.

Typically, though not exclusively, a value or facet of the input data passed from the input layer 201 to a first channel in the first hidden layer, such as channel 211 of layer 1 210, is different than a value/facet passed to a second channel of that same layer, such as to channel 212 of layer 1 210. Conversely, the values of each channel of a given layer are passed to each channel of a subsequent layer, leaving it up to individual channels to determine which of the input values are used in the convolutions of the channel.

Each hidden layer 210, 220, 230 includes a plurality of channels or convolutional nodes. By way of illustration and not limitation, layer 1 210 includes channels 211 through 218, layer 2 220 includes channels 221, 222, 223, 224, 225, 226, 227, and 228, and layer 3 230 includes channels 231, 232, 233, 234, 235, 236, 237, and 238. While the channels of layer 1 210 typically, though not exclusively, have a single input value from the input layer 201, channels of subsequent hidden layers typically have input values from one or more channels of the previous layer. Of course, in various implementations, the channels of the first layer 201 may receive, as input values, all output values of the input layer 201.

In various implementations and as illustrated in the executable machine learning model 200, each hidden layer (except for layer 1 210) accepts input data/signals from each channel of the prior hidden layer, as indicated by the lines proceeding from a channel of an "upper" hidden layer (e.g., layer 210) to a "lower" hidden layer (e.g., 220). Of course, alternative implementations need not include such wide distribution of output values to the channels of a subsequent, lower level hidden layers.

Each channel implements one or more "convolutions," "computations," or "transformations" on the input data it receives (whether the channel receives a single item of input data, or plural items of input data) to produce a single output value. These convolutions, projections, and/or transformations may include any number of functions or operations to generate the output data such as, by way of illustration and not limitation, data aggregations, clustering various input values, transformations of input values, combinations of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given channel such that the weighted input data plays a greater or lesser role in the overall computation for that channel. Items of input data may be weighted in such a manner as to be ignored in the various convolutions and computations. Hyperparameters (data/values that are input from sources external to channels of a prior input level) may also be utilized by all or some of the channels of a hidden layer.

As will be appreciated by those skilled in the art, one of the interesting aspects of training machine learning models is that the various executable levels are adaptable to accommodate self-learning. In other words, when provided feedback, modifications may be made to the weights, parameters, and processing or convolutional operations of the channels in the various layers, in order to achieve better results. Due to this adaptability, except for initially established computations of the various channels in a training phase of the machine learning process, a person is unlikely to have specific insight or knowledge as to the exact nature of output values and, correspondingly, the exact nature of convolutions and/or computations that any particular channel of a hidden layer may utilize. Instead, during the training process of a machine learning model, the machine learning model adaptively makes its own determinations as to how to modify each computation, convolution or transformation of a given channel to produce better and/or superior results from the input values it receives.

At the final hidden layer, e.g., layer 230, the channels provide their output data to the output layer 240. The output layer 240 performs whatever final aggregations, convolutions, calculations, transformations, projections, normalizations and/or interpretations of the various items of input data to produce an output for the neural network.

Figure 2A:
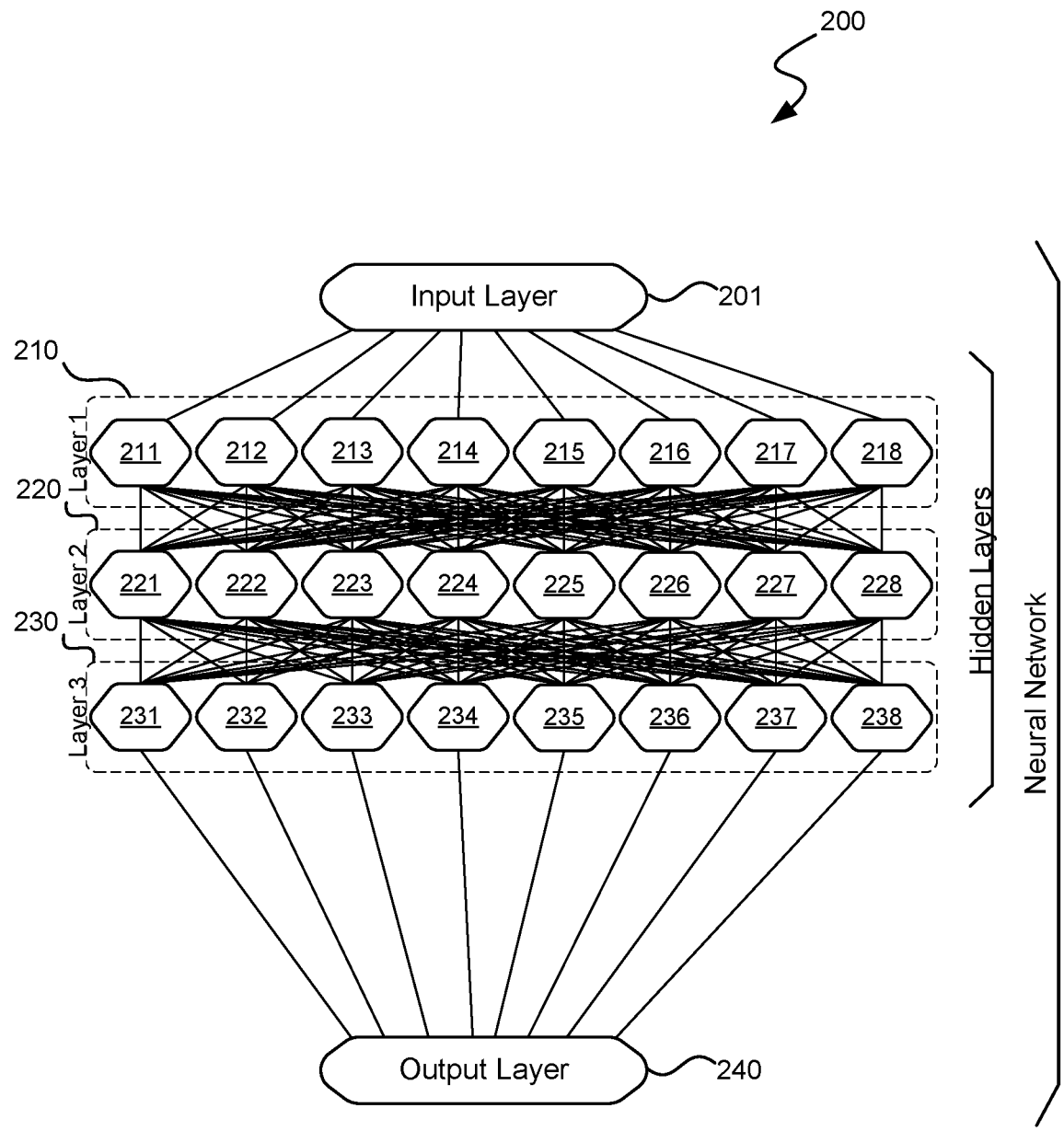
FIGS. 2A through 2E are block diagrams illustrating an example slimmable neural network.
Figure 2B:
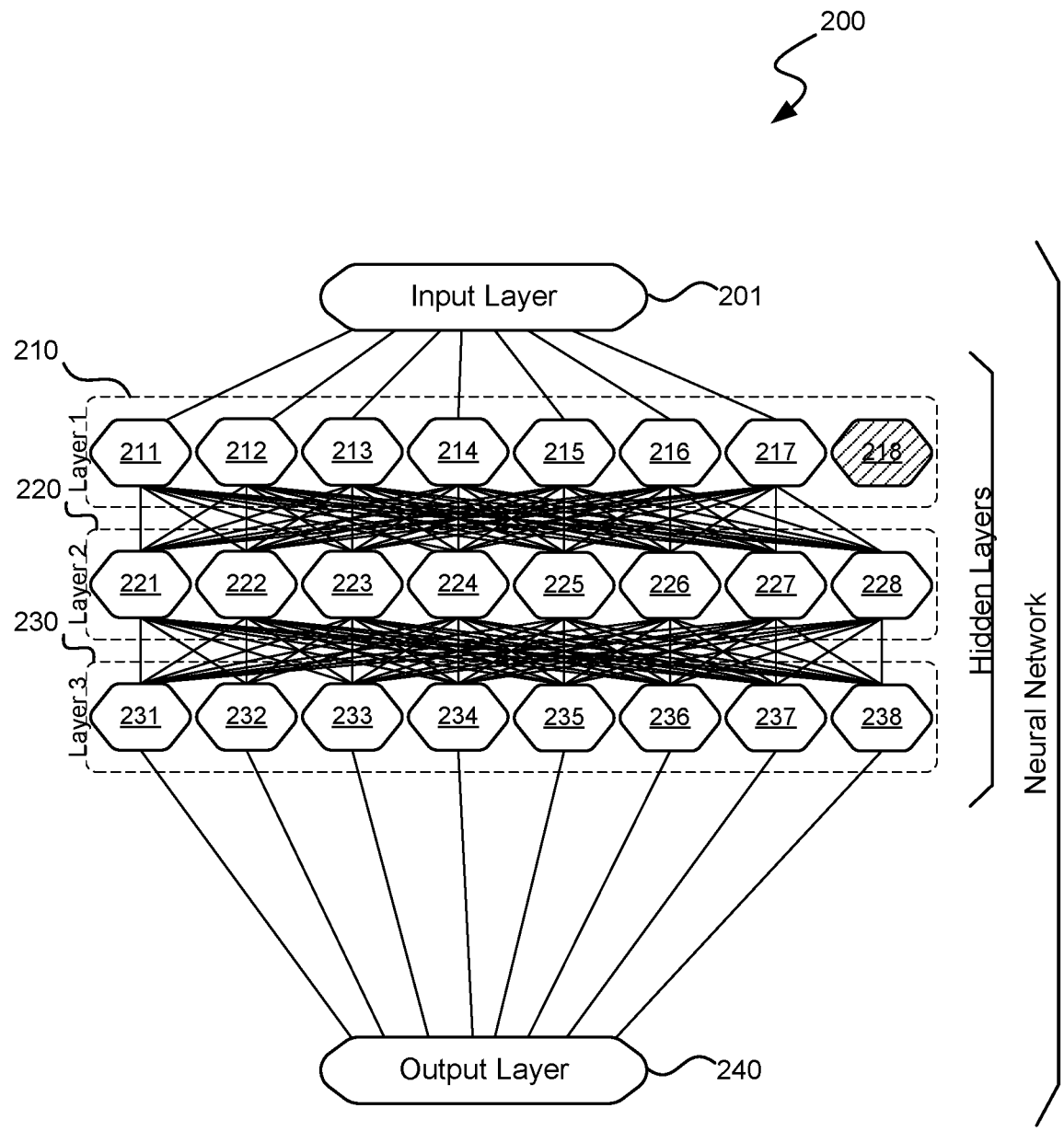
Figure 2C:
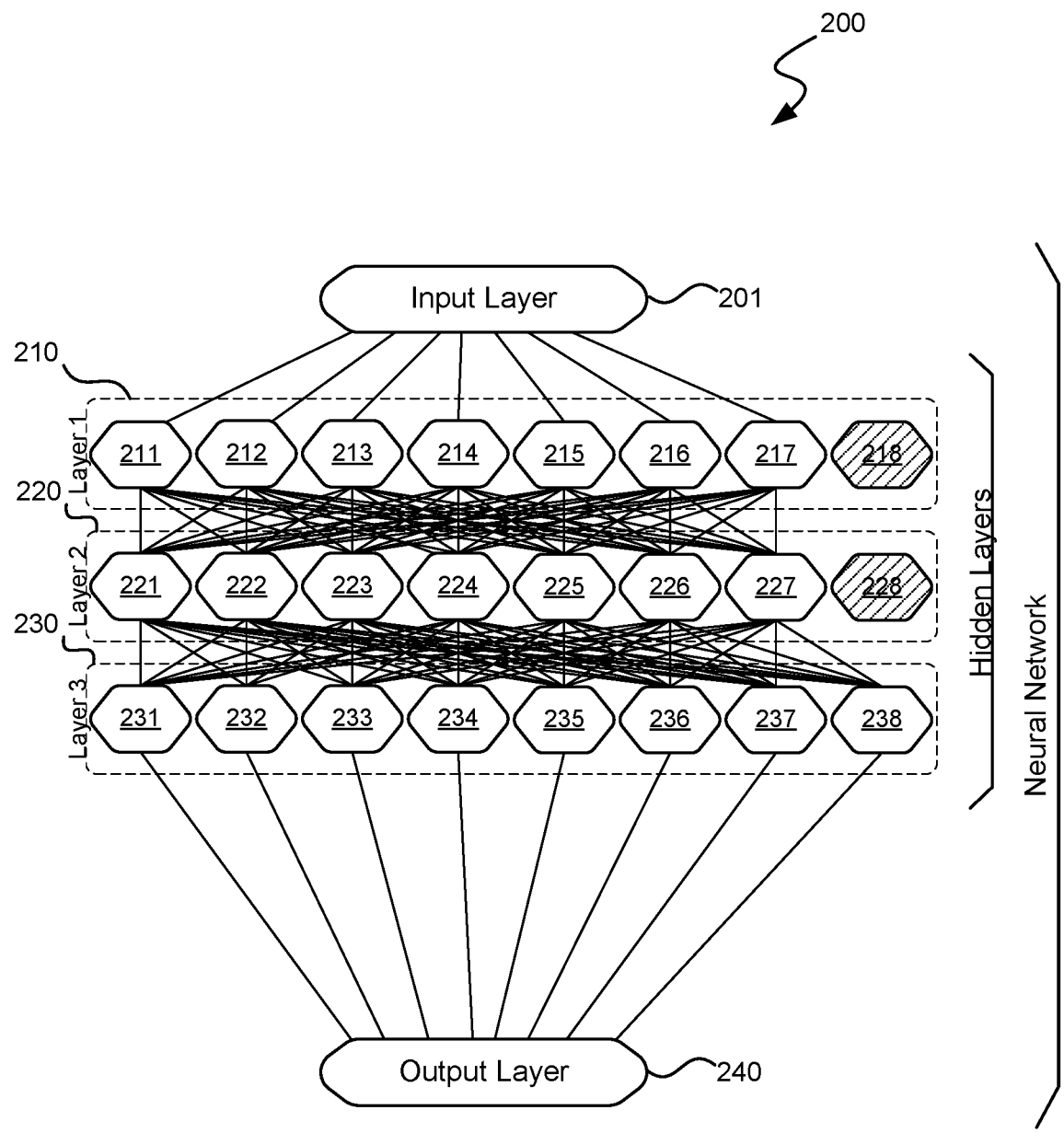
Figure 2D:
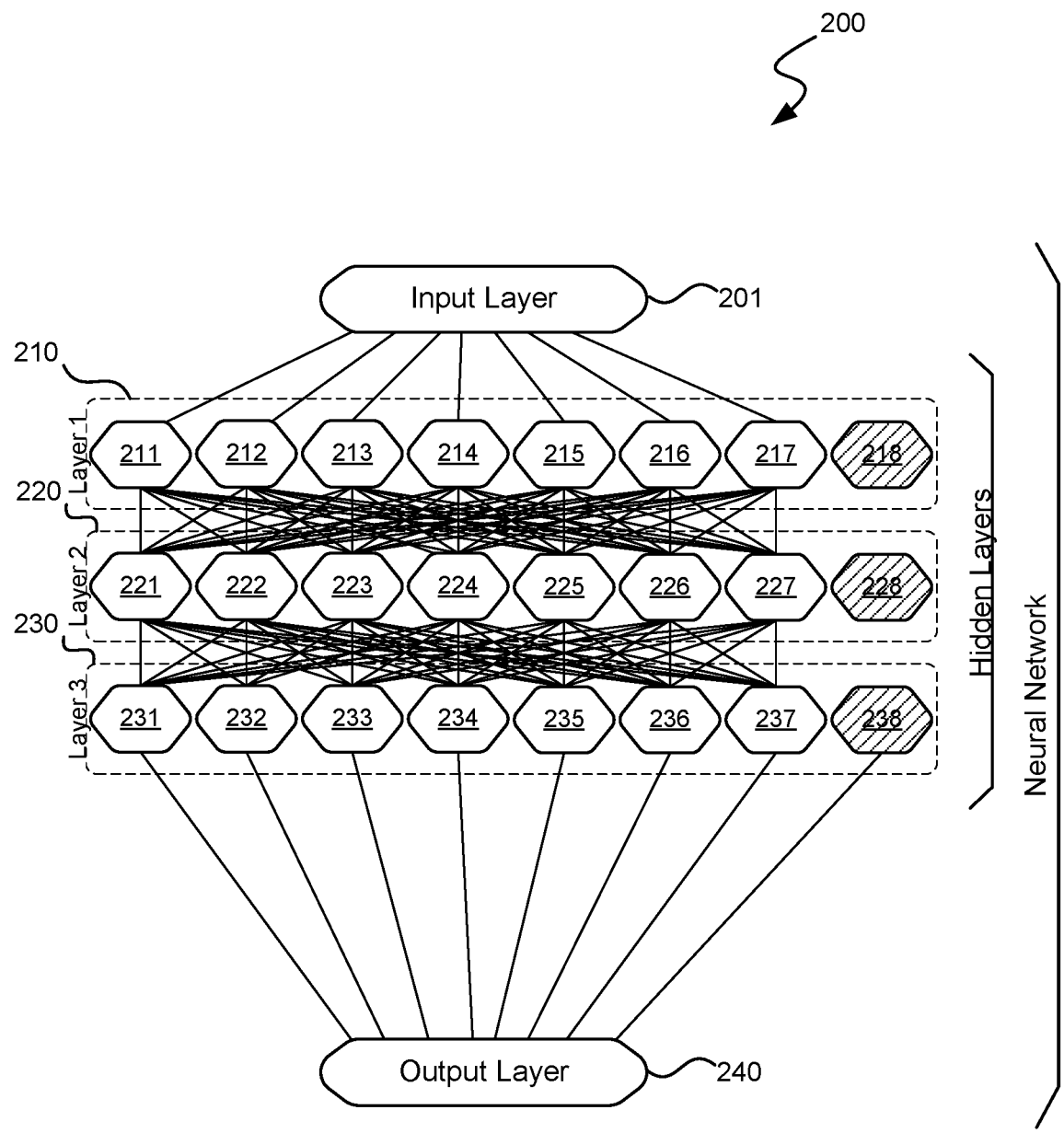

Referring first to FIG. 2B, AutoSlim utilizes a greedy approach that does not differentiate between layers and/or channels of a layer and instead removes a channel from a layer, such as channel 218, as illustrated in FIG. 2B, and determines if the constraint has been achieved. If the constraint has not been achieved, AutoSlim proceeds to the next hidden layer, in this example layer 2 220, utilizes the greedy approach and removes a channel from the layer, such as channel 228, as illustrated in FIG. 2C, and again determines if the constraint has been achieved. Again, if the constraint is not satisfied, AutoSlim moves to the next layer, layer 3 230, utilizes the greedy approach, and removes a channel from that layer, in this example channel 238, as illustrated in FIG. 2D. This process continues progressively through each layer until the network 200 has been slimmed to a level that satisfies the constraint. In the example illustrated in FIGS. 2A through 2E, and referring to FIG. 2E, AutoSlim has removed channels 215 through 218 of layer 1 210, channels 225 through 228 of layer 2 220, and channels 235 through 238 of layer 3 230 until the latency constraint was satisfied. As noted above, each channel was removed in a progressive fashion layer by layer using a greedy approach without regard for the latency or error introduced by the channel.

Figure 2E:
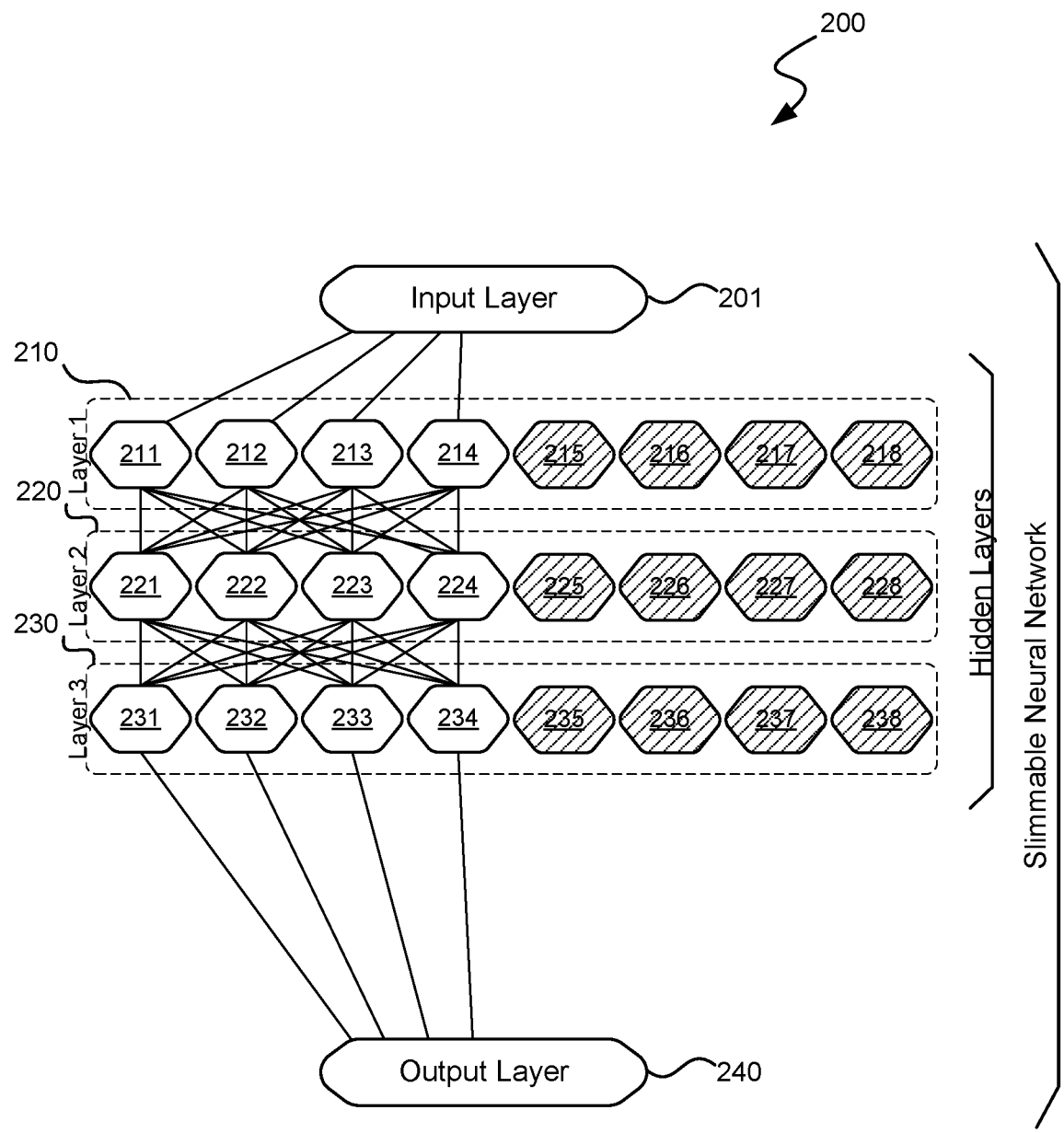
Figure 3A:
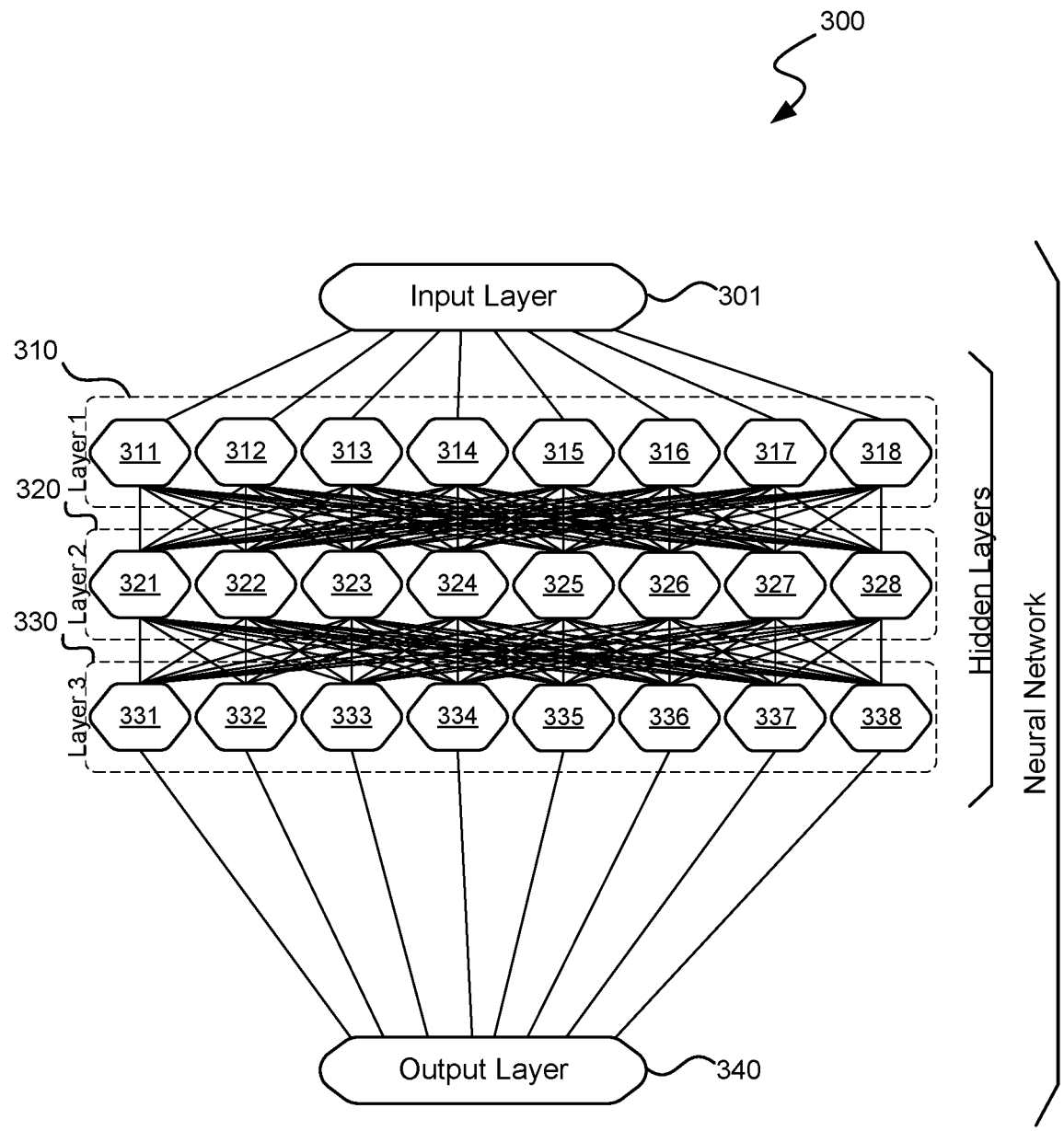
FIGS. 3A and 3B are block diagrams illustrating an example slimmable neural network that may be defined, trained, and slimmed in accordance with the disclosed implementations.
Figure 3B:
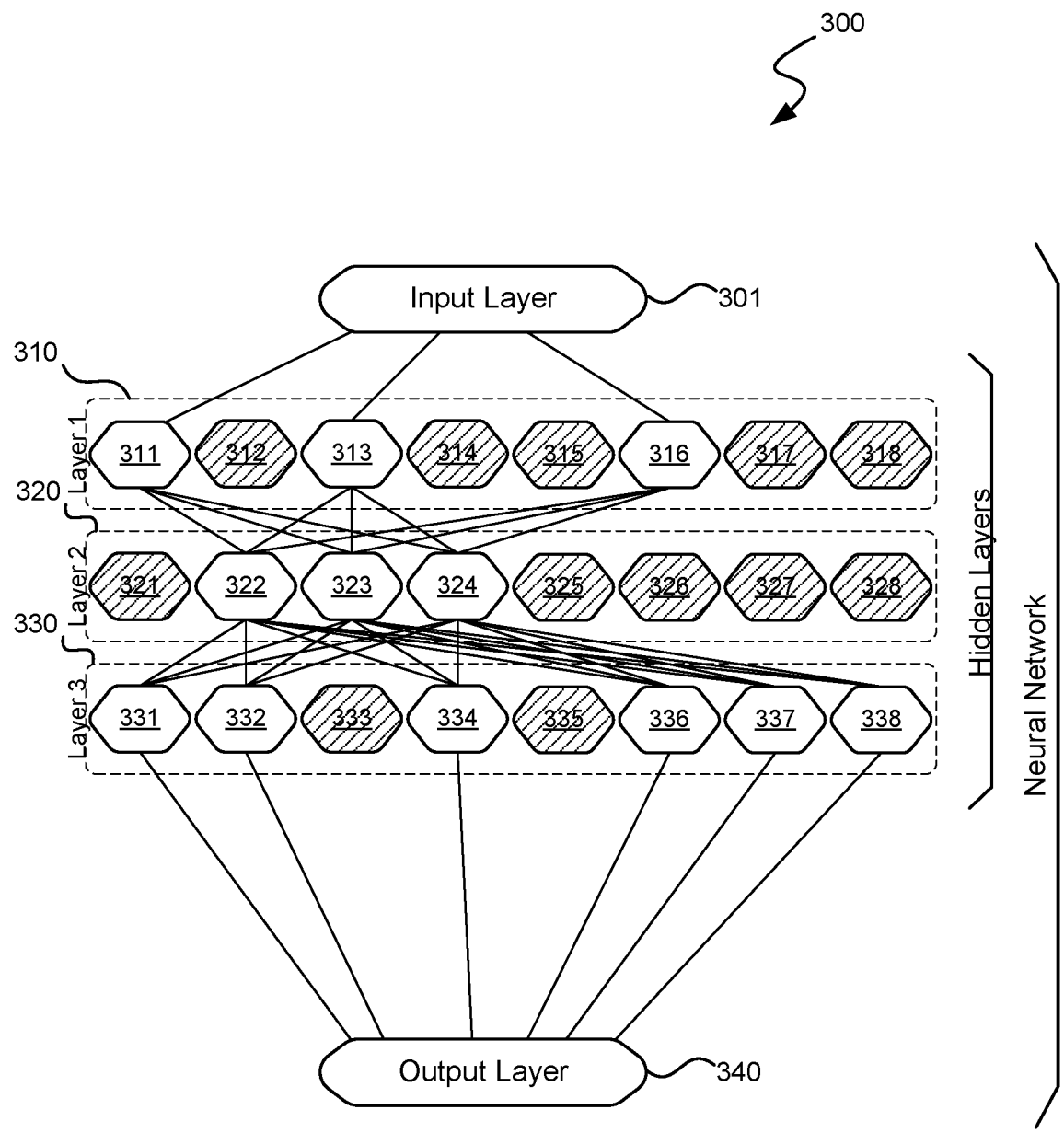

In comparison to the approach illustrated in FIGS. 2B through 2E to slim the slimmable neural network 200 illustrated in FIG. 2A, FIGS. 3A and 3B are block diagrams illustrating an example slimmable neural network 300 that may be defined, trained, and slimmed in accordance with the disclosed implementations.

As discussed further below, the disclosed implementations provide a technological improvement over the existing process discussed with respect to FIGS. 2A through 2E by globally determining per-channel error rates and channel latencies for each channel within each layer and then removing channels based on the latency and error of those channels.

In this example, slimmable neural network 300 of FIG. 3A corresponds to the same slimmable neural network 200 illustrated in FIG. 2A. As discussed further below, prior to removal of any channels from any layers of the slimmable neural network 300, the disclosed implementations determine per-channel error rates and channel latencies for each channel of each layer within the network 300. Once the channel errors and latencies are determined, the disclosed implementations remove channels that present the highest errors and/or latencies such that the latency target is satisfied. As illustrated in FIG. 3B, channel removal is not performed on layer by layer basis but based on the determined global channel errors and latencies. For example, in FIG. 3B, subsequent to determining channel error rates and latencies for the slimmable neural network 300, channels 212, 214, 215, 217, 218, 221, 225, 226, 227, 228, 233, and 235. As illustrated, channel removal is not layer dependent and is based on latency and error determined for the channels.

As illustrated, based on a comparison of FIG. 2E and FIG. 3B, with the disclosed implementations, rather than utilizing a greedy approach that iteratively removes channels from each layer, the disclosed implementations, in this example, remove more channels from the higher layers, layer 1 210 and layer 2 220, while removing fewer channels from the lower layers 230. In other implementations, more channels may be removed from lower layers than higher layers. As discussed, the disclosed implementations result in lower error rates while achieving the same or better latency.

Figure 4:
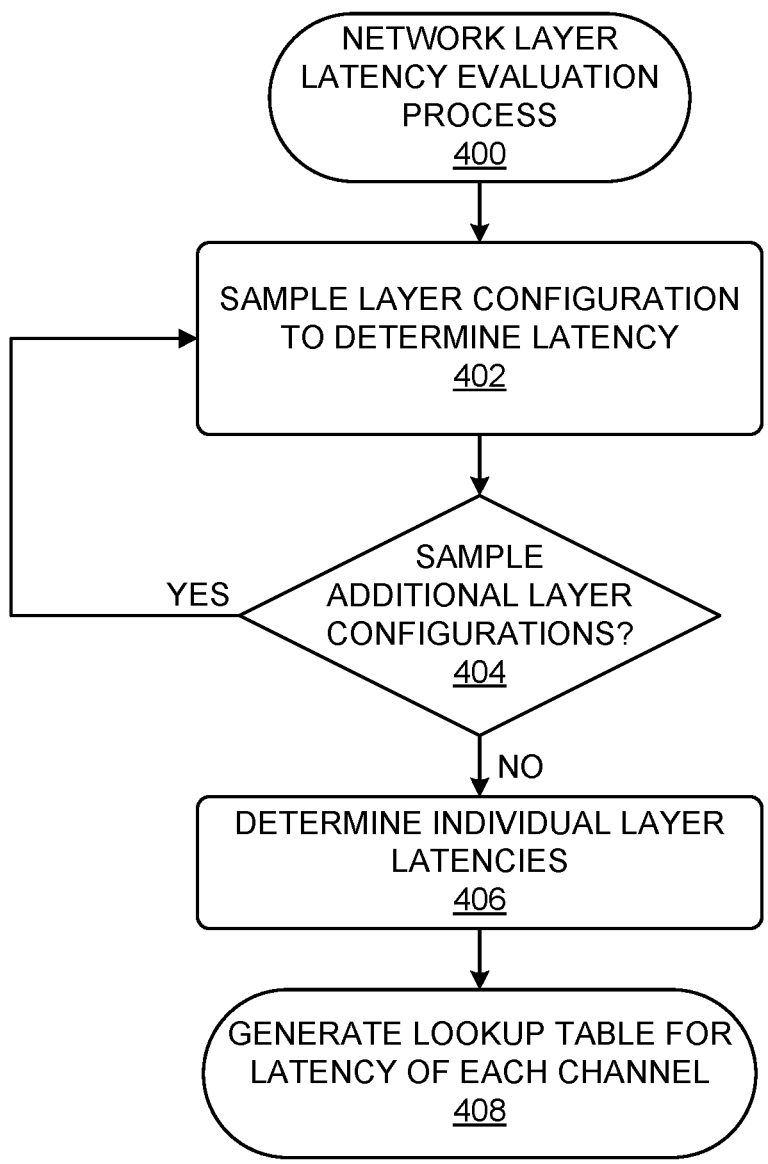
FIG. 4 is an example process for network layer latency evaluation of a network L(N), in accordance with disclosed implementations.

FIG. 4 is an example process 400 for network layer latency evaluation of a network L(N), in accordance with disclosed implementations.

For a convolutional layer, the theoretical floating point operations per second ("FLOPs") is given by:

$$c_{in}c_{out}WHk^2/s^2 \qquad (1)$$

where $c_{in}$, $c_{out}$ are input and output channel numbers, (W, H) are the input spatial dimensions, k is the kernel size, and s the stride. As discussed herein, the dependency of the latency of the slimmable neural network, as measured in practice to the number of FLOPs, is highly non-linear. This dependency is because parallelization of the operations make the latency dependent on external factors, such as the number of threads fitting on a device for given parameters, caching and memory allocation, and/or tuning of various inference libraries, such as CUDA Deep Neural Network library ("CuDNN") or Tensor Runtime library ("TensorRT"). Rather than attempting to model the low-level phenomenons that govern the dependency between the channel numbers and inference time, the disclosed implementations create a look-up table that models the latency of each layer of the network as a function of the channel numbers.

In some implementations, parameters of each layer i that are different from the channel numbers and that are likely to have an impact on the latency of the layer are encoded as $\Theta_i$. Parameters may include, but are not limited to, the layer type (e.g., convolutional—depthwise/pointwise convolutional, etc.), the layer input size, the layer stride, etc. With the parameters embedded, the latency can be represented as a sum:

$$L(N(c_1, \ldots, c_n)) = \sum_{i=1}^{n-1} L_{\Theta_i}(c_i, c_{i+1}) \qquad (2)$$

where each layer's latency depends on the input and output channel numbers $c_i$, $c_{i+1}$ as well as the fixed parameters $\Theta_i$.

To determine each element $L_{\Theta_i}(c_i, c_i)$, the inference of the entire network is profiled based on a measure of the latency of a set of p channel configurations ($c^1 \ldots c^p$), as 402. As each layer configuration is sampled, a determination is made as to whether additional layer configuration sampling is to be performed, as in 404. In some implementations, sampling is performed such that each individual layer configuration in the following search space is sampled at least once:

$$\{L_{\Theta_i}(c_i, c_{i+1}), i \in [1, n-1], c_i \in C_i, c_{i+1} \in C_j\} \qquad (3)$$

Sampling may be done uniformly among channel configurations, or biased towards unseen layer configurations using dynamic programming, as discussed further below with respect to FIG. 6.

If it is determined that additional sampling is to be performed, the example process 400 returns to block 402 and continues. If it is determined that additional sampling is not to be performed, a set of measured latencies $(L(N(c^j))= l_j)_{j=1 \ldots P}$, is formed which, by equation (2) above, yields a linear system in the variables of the following latency model $L_{\Theta_i}(c_i, c_{i+1})$ $$\sum_{i=1}^{n-1} L_{\Theta_i}(c_i^j, c_{i+1}^j) = l_j \; \forall j = 1 \ldots P \qquad (4)$$

This system can be summarized as Ax=l where A is a sparse matrix encoding the profiled configurations, l is the corresponding vector of measured latencies and x contains all the variables of the latency model (equation (3)). The linear system may then be used to determine individual layer latencies, as in 406. For example, the linear system may be solved using a least-square solver to obtain the individual layer latencies. Based on the individual layer latencies and the linear system of measured latencies, the example process 400 may also generate a lookup table for the latency of each channel within each layer, as in 408.

The example process 400 discussed with respect to FIG. 4 and equations (1) through (4) above yields to a very accurate latency model for the search of channel numbers. In addition, the example process 400 is framework-agnostic and does not depend on the availability of low-level profilers on the inference platform which would detail the execution time of each layer in the network. Moreover, access to a low-level profiler would still require solving the problem of assigning the memory allocation and transfers to the right layer in the network. In comparison, the example process 400 resolves this issue automatically and assigns the overheads in order to best satisfy the latency model of equation (2).

In some implementations, the solution to the least-square problem used to solve equation (4) may be improved by adding monotonicity priors, enforcing the following inequalities:

$$L_{\Theta_i}(c_i, c_k) \leq L_{\Theta_i}(c_j, c_k) \text{ if } c_i < c_j$$

$$L_{\Theta_i}(c_k, c_k) \leq L_{\Theta_i}(c_j, c_l) \text{ if } c_k < c_l \qquad (5)$$

Similar inequalities may also be used for configurations with differing input sizes. For example, the inequalities may be written as $Vx \leq 0$ where V is a sparse matrix, and injected into the least-square solver. Including the inequalities, translates into the following least-square problem $$\text{minimize } \|Ax-l\| + \lambda \max(Vx, 0) \qquad (6)$$

where the weighting parameter $\lambda$ can be set using a validation set. The minimization of equation (6) can be solved efficiently using a second-order cone program solver.

Figure 5:
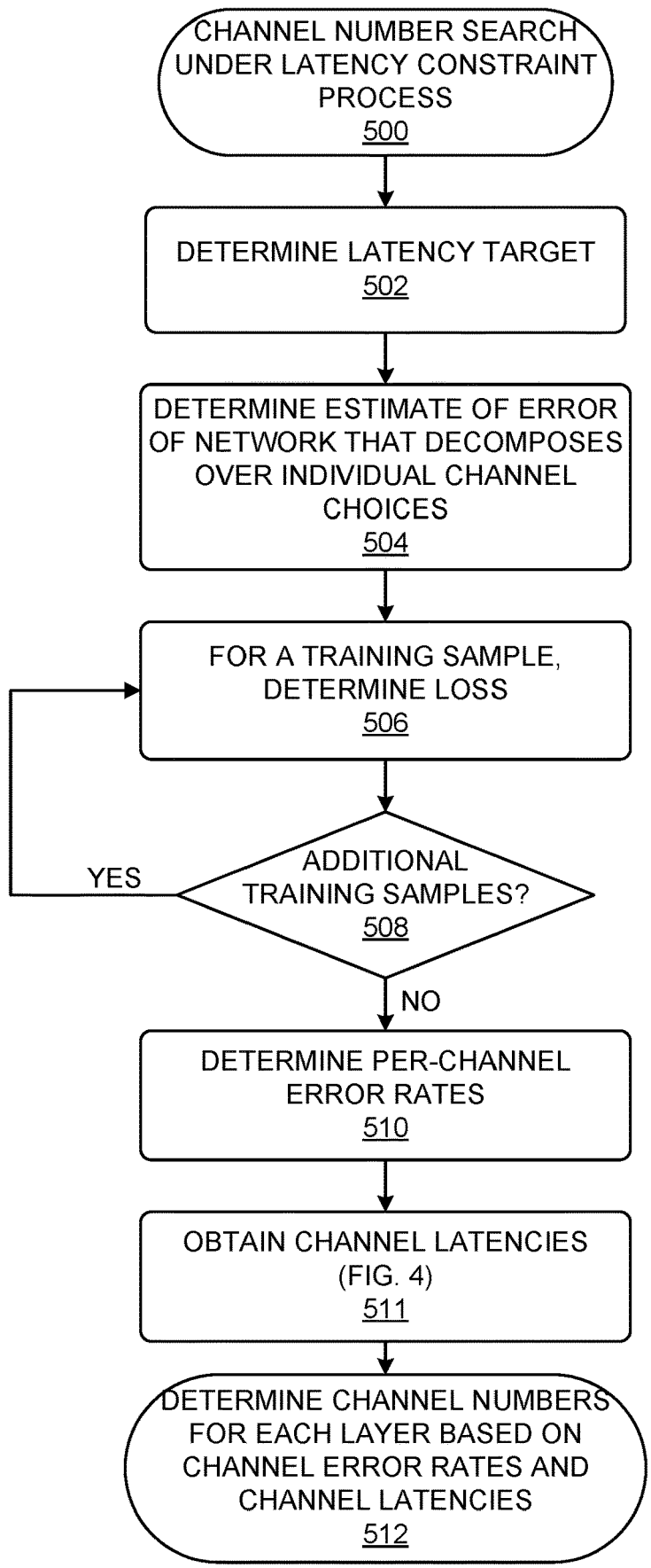
FIG. 5 is an example channel number search under latency constraint process, in accordance with described implementations.

FIG. 5 is an example channel number search under latency constraint process 500, in accordance with described implementations.

The example process 500 begins by determining a latency target $L_T$, as in 502. The latency target may be determined, for example, based on constraints (e.g., compute, memory, response time, etc.) of a device on which the slimmed network is to operate.

The NAS problem, for channel number search under latency constraint, can be written as $$\min_{c_1, \ldots, c_n} \Delta(N(c)) \text{ such that } L(N(c)) < L_T \qquad (7)$$

Applying a Lagrangian relaxation to the problem results in:

$$\max_{\gamma} \min_{c_1, \ldots, c_n} \Delta(N(c)) + \gamma(L(N(c)) - L_T) \qquad (8)$$

with $\gamma$ a Lagrange multiplier for network compression. Assuming that the subproblems $$\min_c \Delta(N(c)) + \gamma L(N(c)) \qquad (9)$$

can be solved efficiently, the minimization in equation (8) can be solved by binary search over γ with the object decreasing in γ. This may be accomplished by setting the runtime penalty L(N(c)) in equation (9) such that the constraint is satisfied.

To ensure that the subproblem in equation (9) can be solved efficiently, an estimate of the error of a network is determined that decomposes over the individual channel choices as $$\Delta(N(c)) \approx \sum_{i=1}^{n} \delta_i(c_i),$$

as in 504. Because our latency model decomposes over pairs of successive layers (equation (2)), equation (9) can be rewritten as:

$$\min_{c_1,\ldots,c_n} \sum_{i=1}^{n} \delta_i(c_i) + \gamma \sum_{i=1}^{n-1} L_{\Theta_i}(c_i, c_{i+1}) \qquad (10)$$

In some implementations, as part of training, rather than sampling one unique channel configuration per training batch, different channel configuration may be sampled separately for each element in the batch. For example, sampling may be performed at each layer i by first computing the "max-channel" output for all elements in the batch, before eliminating channels above the sampled channel numbers for each individual element. Despite some wasted computation in the removed channels, this batched computation is faster than a separate computation for each element.

For each training sample $x^t$, a loss $\ell(x^t, c^t)$ may be determined, as in 506. For example, for each training sample, a random channel configuration $c^t$ may be sampled to determine the loss $\ell(x^t, c^t)$. After determining the loss of the channel configuration for the training sample, a determination is made as to whether additional training samples remain for processing, as in 508. If additional training samples remain, the example process 500 returns to block 506 and computes a loss for the next training sample and channel configuration.

If it is determined that losses have been computed for each training sample, per-channel error rates are determined, as in 510. Per-channel error rates may be determined by considering, for each layer i=1 . . . n, the set of training iterations $T_i(c_i)=\{t | c_i^t = c_i\} \subseteq \mathbb{N}$ where a particular channel number $c_i \in C_i$ is used. The per-channel error rates in equation (10) may then be defined as below and according to the intuition that good channel numbers for each layer lead to lower error.

$$\delta_i(c_i) = \frac{1}{|T_i(c_i)|} \sum_{t \in T_i(c_i)} \ell(x^t, c^t) \qquad (11)$$

In some implementations, the average computed in equation (11) may only be performed over the last training epoch. In addition, the large number of training iterations considered in equation (11) ensures that the per-channel error rates have significance, compared to traditional approaches that consider higher level interactions between channel numbers. In comparison, the described decomposition enables performance of an exhaustive search over the search space using the Viterbi algorithm of equation (10).

In addition, the example process 500 obtains the channel latencies for each channel of each layer determined by the example process 400, as in 511. Finally, based at least in part on the per channel error rates determined at each layer, and the channel latencies of the channels, the channel numbers for each layer are determined to satisfy the latency target for the device, as in 512.

Figure 6:
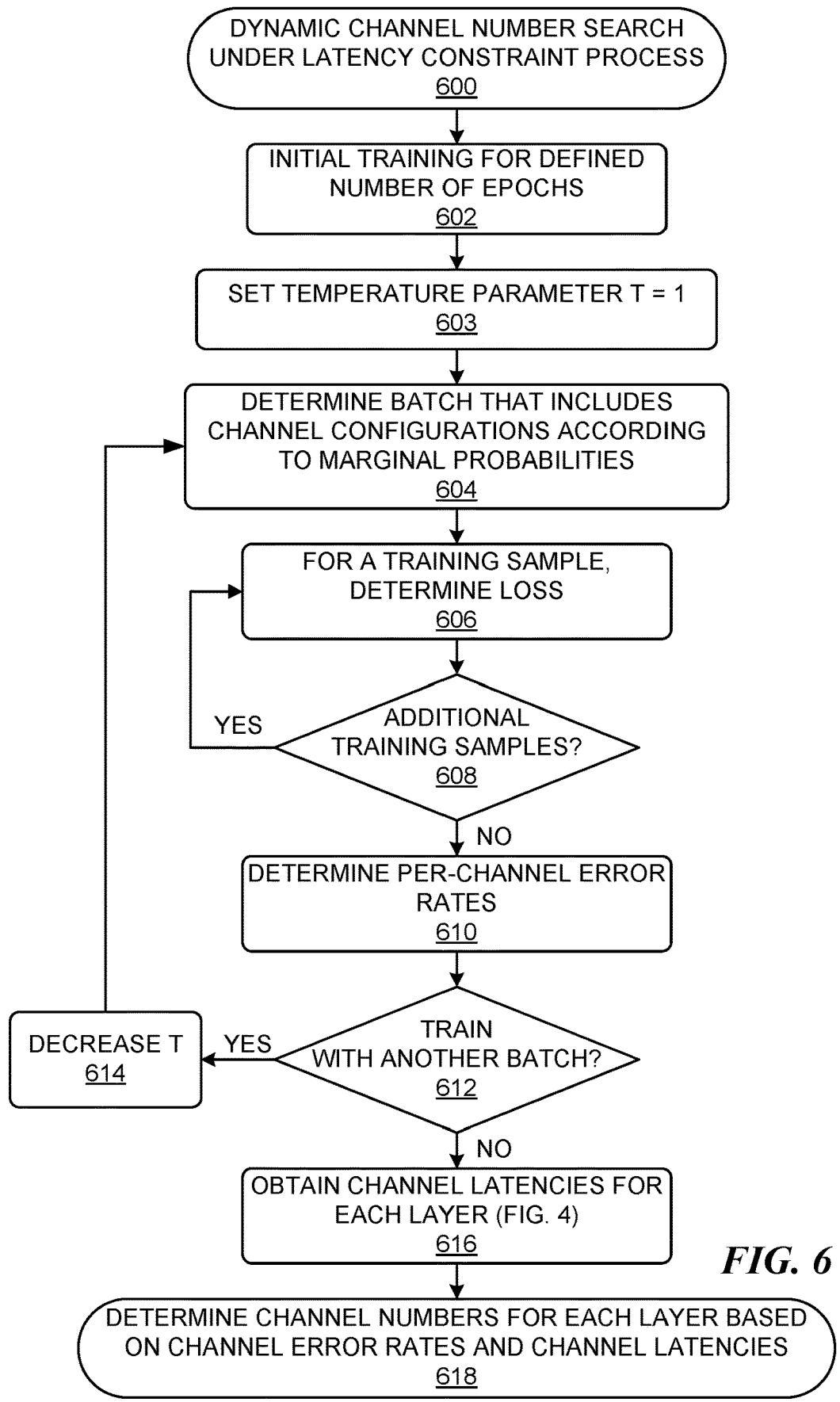
FIG. 6 is an example dynamic channel number search under latency constraints process, in accordance with described implementations.

FIG. 6 is an example dynamic channel number search under latency constraints process 600, in accordance with described implementations.

The example process 600 is based on the above discussed implementations and further improves those implementations by biasing the training of the network. As discussed above with respect to FIGS. 4 and 5, the disclosed implements provide an efficient global search over channel configurations. The example process 600 further improves the implementations by refining training to concentrate on channel configurations around a region of interest in the NAS search space. For example, to refine the training around the solutions close to the minimum in equation (10), the Viterbi algorithm (min-sum) may be relaxed using a differentiable dynamic programming procedure. For example, the minimization in equation (10) may be relaxed into a smoothed min operation computed by replacing the min operation with a log-sum-exp operation in the Viterbi forward pass. In such a configuration, the messages sent from layer i to layer i+1 become $$m(c_{i+1}) = \log \sum_{c_i} \exp -\frac{1}{T}\left(m(c_i) + \delta_i(c_{i+1}) + \gamma L_{\Theta_i}(c_i, c_{i+1})\right) \qquad (12)$$

where T is a temperature parameter that controls the smoothness of the relaxation. The forward-backward pass of the relaxed min-sum algorithm yields log-marginal probabilities log $p_i(c_i)$ for each layer whose mass is concentrated close to configurations minimizing equation (10). For T=1, these correspond to the marginal probabilities of the pairwise conditional random fields ("CRF") defined by the energy of equation (10). In the limit T→0, the probabilities become Dirac distributions corresponding to the maximum a posteriori ("MAP") inference of that CRF, as computed by the Viterbi algorithm.

To achieve biasing during training, the example process 600 begins by first training the slimmable neural network through a defined number of epochs using the implementations discussed above, or any other slimmable neural network training process, such as AutoSlim, as in 602. The defined number of epochs may be any defined number. For example, initial training may progress through one epoch. In other implementations, initial training may progress through five epochs or more.

After the network has been pre-trained using the above implementations or another slimmable network training process for a defined number of epochs, the temperature parameter T in equation (12) is set to 1, as in 603, and a batch that includes channel configurations determined according to according to the marginal probabilities $p_i(c_i)$, as in 604. When T=1, the batch may include all potential channel configurations. In comparison, as T decreases, the potential channel configurations included in the batch are reduced to those that near a region of interest within the search space.

Similar to the example process 500 (FIG. 5) For each training sample $x^t$, a loss $\ell(x^t, c^t)$ may be determined, as in 606. For example, for each training sample, a random channel configuration $c^t$ from within the determined batch may be sampled to determine the loss $\ell(x^t, c^t)$. After determining the loss of the channel configuration for the training sample, a determination is made as to whether additional training samples remain for processing, as in 608. If additional training samples remain, the example process 600 returns to block 606 and computes a loss for the next training sample and channel configuration within the batch.

If it is determined that losses have been computed for each training sample, per-channel error rates are determined, as in 610. As discussed above, per-channel error rates may be determined by considering, for each layer i=1 . . . n, the set of training iterations $T_i(c_i)=\{t|c_i^t=c_i\}\subseteq \mathbb{N}$ where a particular channel number $c_i \in C_i$ is used. The per-channel error rates in equation (10) may then be defined as discussed above in equation (11).

A determination may then be made as to whether additional training with another batch of channel configurations is to be performed, as in 612. If it is determined that additional training with another batch is to be performed, the temperature parameter T is decreased, as in 614, and the example process 600 returns to block 604 and continues. As discussed above, as T is decreased, the channel configurations are biased toward a region of interest, decreasing the potential channel configurations in the batch.

If it is determined at decision block 612 that no addition training is to be performed, channel latencies for each channel of each channel layer determined by the example process 400 (FIG. 4) are obtained, as in 616. Finally, based at least in part on the per channel error rates determined at each layer, and the channel latencies of the channels, the channel numbers for each layer are determined to satisfy the latency target for the device, as in 618.

The example process 600 progressively favors channel configurations that are close to minimizing equation (10). This reduction in diversity of the channel configurations ensures that the training of the slimmable model becomes closer to the training of a single model and ensures that the per-channel error rates (equation (11)) are averaged only over relevant channel configurations. Averaging only over relevant channel configurations provides an implicit coupling between the channel numbers of different layers in the network.

Figure 7:
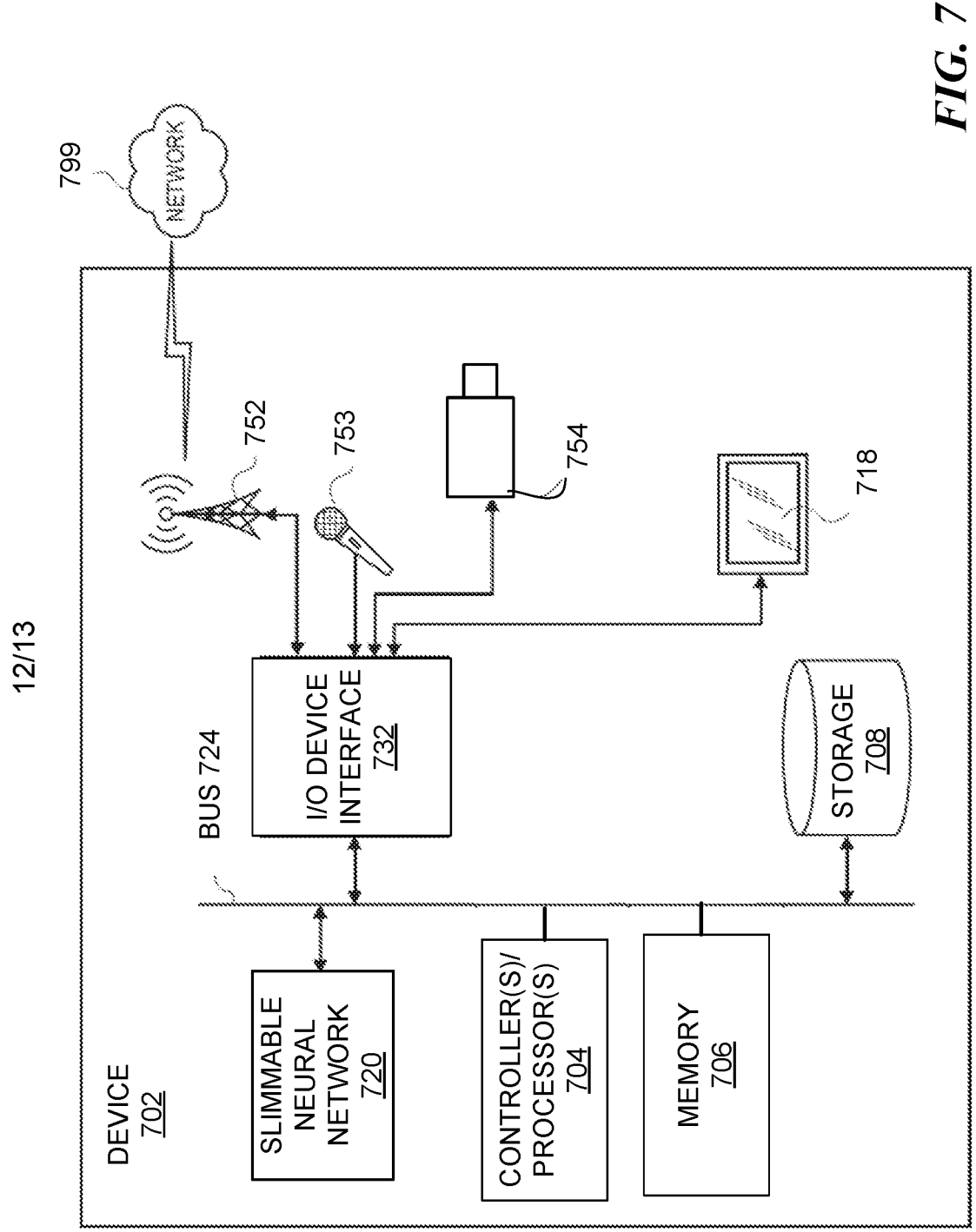
FIG. 7 is a block diagram conceptually illustrating a resource constrained device that may be used with the described implementation.
Figure 8:
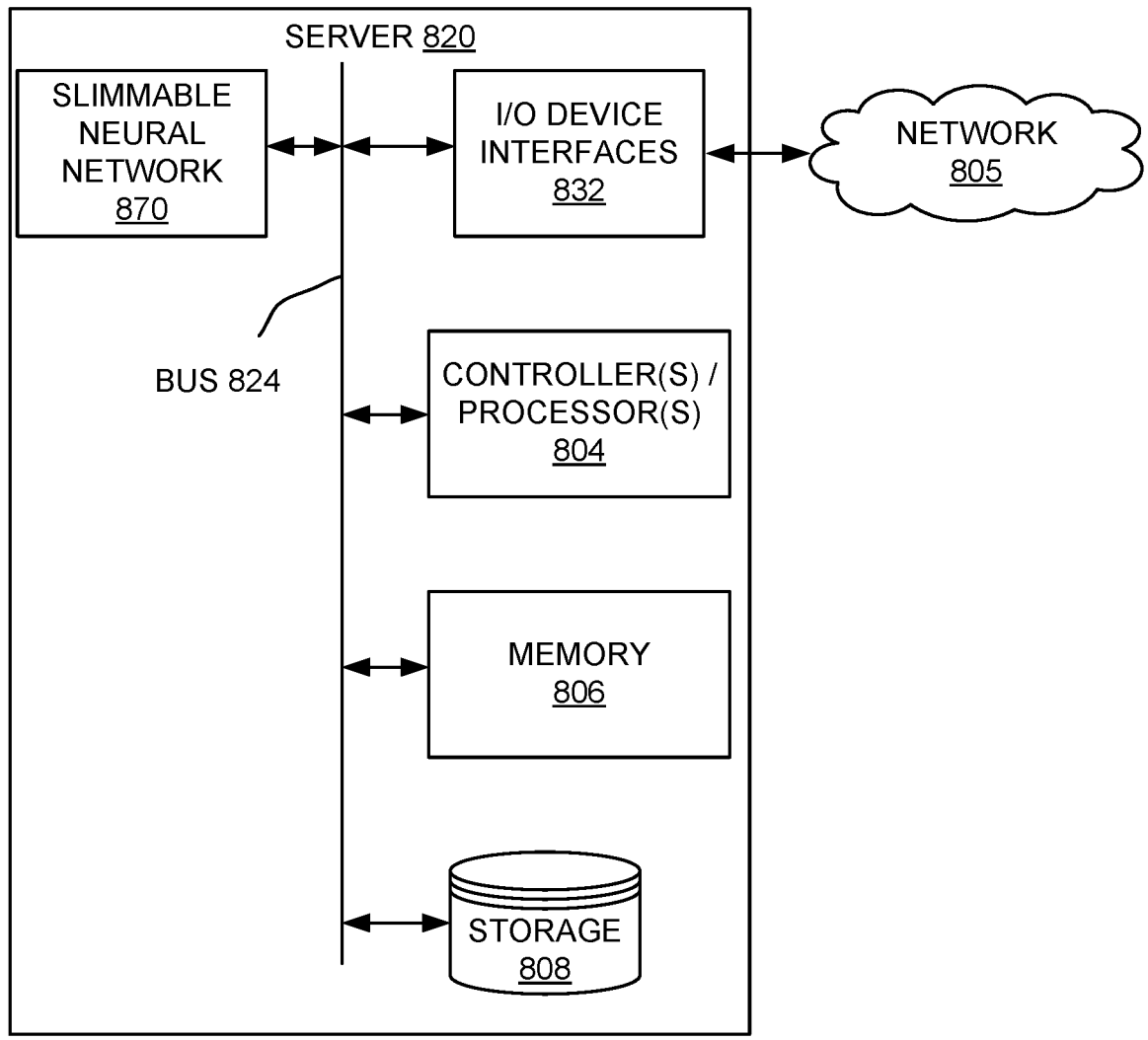
FIG. 8 is a block diagram conceptually illustrating example components of a server that may be used with the disclosed implementations.

FIG. 7 is a block diagram conceptually illustrating a resource constrained device 702, such as a camera, depth sensor, imaging element, etc., that may be used with the described implementation. For example, the device 702 may correspond to one or more of the devices 112 of FIG. 1. FIG. 8 is a block diagram conceptually illustrating example components of a remote device, such as a server 820 that may be used with the disclosed implementations. For example, the server 820 may correspond to the server 124 of FIG. 1. Multiple such servers 820 may be included in the system and/or multiple different slimmable neural networks may be executed on the server 820 and/or device 702. For example, a first slimmable neural network may be trained to identify items (e.g., inventory items), a second slimmable neural network may be trained to identify users, a third slimmable neural network may be trained to detect actions (e.g., pick, place, etc.). Each of the slimmable neural networks may execute on one or more servers 820 and/or on one or more resource constrained devices 702. In operation, each of the devices 702 and/or servers 820 may include computer-readable and computer-executable instructions that reside on the respective device (702/820), as will be discussed further below.

Each of these devices (702/820) may include one or more controllers/processors (704/804), that may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive (MRAM) and/or other types of memory. Each device may also include a data storage component (708/808), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (732/832).

Computer instructions for operating each device (702/820) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

While the memories (706/806), storage components (708/808), controllers/processors (704/804) of the device 702 and server 820 are discussed together, as discussed above, the capabilities of those components between the devices may vary dramatically with the former (device 702) having resource constraints, such as less memory, less compute power, less storage, etc., compared to the server 820.

Each device (702/820) includes input/output device interfaces (732/832). A variety of components may be connected through the input/output device interfaces. Additionally, each device (702/820) may include an address/data bus (724/824) for conveying data among components of the respective device. Each component within a device (702/820) may also be directly connected to other components in addition to (or instead of) being connected to other components across the bus (724/824).

Referring to the device 702 of FIG. 7, the device 702 may include one or more inputs, such as a microphone 753, camera 754, depth sensor 718, etc., that is operable to collect data from within an environment in which the device 702 is positioned. Each of the one or more input devices 753, 754, 718 may connect to the I/O device interface 732 to provide data to the device 702. The device 702 (using input/output device interfaces 732, antenna 752, etc.) may also be configured to transmit the data, such as data collected by the one or more inputs, to server 820 for further processing or to process the data using internal components such as a slimmable neural network 720. In still other examples, outputs from the slimmable neural network 720 may be transmitted from the device 702 to the server 820.

For example, via the antenna(s) 752, the input/output device interfaces 732 may connect to one or more networks 799/805 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported. Through the network(s) 799/805, data and/or slimmable neural networks may be distributed across a networked environment.

The server 820 may also include an instance of the one or more slimmable neural networks 870. As discussed above, the slimmable neural network 870 may have more channels active compared to the slimmable neural network 720 executing on the resource constrained device 702.

The components of the devices 702 and server 820, as illustrated in FIGS. 7 and 8, are exemplary. Likewise, the concepts disclosed herein may be applied within a number of different devices and computer systems, including, for example, general-purpose computing systems, specific-purpose devices (e.g., cameras, depth sensors, microphones, etc.), portable devices, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and neural networks should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    determining a latency target of a device upon which a slimmable neural network having a plurality of layers is to operate;
    determining an estimate of error of the slimmable neural network;
    for each of a plurality of training samples:
        determining a random channel configuration through the slimmable neural network; and
        determining a loss for the training sample through the random channel configuration of the slimmable neural network;
    determining per-channel error rates for each channel of the slimmable neural network based at least in part on the determined losses for each of the plurality of training samples and a number of training iterations in which the channel was used;
    determining, based at least in part on the per-channel error rates, channel numbers for each of the plurality of layers of the slimmable neural network such that a network latency is less than or equal to the latency target;
    slimming the slimmable neural network by removing channels of the slimmable neural network such that only the determined channel numbers for each of the plurality of layers remain; and
    executing, on the device, the slimmable neural network with only the determined channels included for each of the plurality of layers.

2. The computer-implemented method of claim 1, wherein determining the estimate of error includes determining the estimate of error of the slimmable neural network that decomposes over individual channel choices.

3. The computer-implemented method of claim 1, wherein slimming the slimmable neural network includes:
    removing a first plurality of channels from a first layer of the plurality of layers; and
    removing a second plurality of channels from a second layer of the plurality of layers, wherein the first plurality of channels is different than the second plurality of channels.

4. The computer-implemented method of claim 1, wherein determining the per-channel error rates further includes:
    sampling a random channel configuration ($c^r$) to determine a loss $\ell(x^t, c^r)$ for the random channel configuration; and
    determining the per-channel error rate $\delta_i(c_i)$ based at least in part on the loss.

5. The computer-implemented method of claim 1, wherein the device is a resource constrained device.

6. The computer-implemented method of claim 1, wherein the device is a camera and the slimmable neural network is trained to process data generated by the camera.

7. A method, comprising:
    initially training a neural network for a defined number of epochs using a uniform sampling of configuration; and
    for each of a plurality of training iterations to train the neural network:
        sampling a batch of channel configurations;
        performing a training step of the neural network;
        updating, based at least in part on a loss determined from the training step, a per-channel error rate for channels of the network; and
        decreasing a temperature parameter (T) included in a marginal probability to reduce channel configurations included in the batch to those that concentrate around a region of interest within a search space of the neural network.

8. The method of claim 7, wherein the temperature parameter is decreased according to an annealing schedule.

9. The method of claim 7, wherein decreasing the temperature parameter with each of the plurality of training iterations progressively favors channel configurations of the neural network that are close to minimizing a relaxed minimization equation.

10. The method of claim 7, wherein the reduced channel configurations are close to minimizing a relaxed minimization equation.

11. The method of claim 9, wherein the temperature parameter controls a smoothness of the relaxation.

12. The method of claim 9, wherein the relaxed minimization equation is represented as:

$$m(c_{i+1}) = \log \sum_{c_i} \exp -\frac{1}{T}\bigl(m(c_i) + \delta_i(c_{i+1}) + \gamma L_{\Theta_i}(c_i, c_{i+1})\bigr).$$

13. The method of claim 12, wherein $\delta_i(c_{i+1})$ represents a per-channel error rate.

14. A computing system, comprising:
one or more processors; and
a memory storing program instructions that when executed by the one or more processors cause the one or more processors to at least:
determine an estimate of error of a network that decomposes over individual channel choices of the network;
for each of a plurality of training batches, sample a different channel configuration separately for each element in the training batch during a training of the network to determine a loss of each channel;
determine a per-channel error rate for each channel of each layer of the network based at least in part on the determined losses and a number of training iterations in which the channel was used; and
select channel numbers for each layer based at least in part on the per-channel error rate.

15. The computing system of claim 14, wherein the program instructions that, when executed by the one or more processors, further cause the one or more processors to at least:
determine a latency target for the network.

16. The computing system of claim 15, wherein the latency target is determined based at least in part on a device upon which the network is to be deployed.

17. The computing system of claim 16, wherein the device is a resource constrained device that generates data that is provided as an input to the network when deployed on the device.

18. The computing system of claim 14, wherein the program instructions that, when executed by the one or more processors, further cause the one or more processors to at least:
bias at least one channel configuration selection to refine the sampling of the channel configuration around a region of interest.

19. The computing system of claim 18, wherein bias of the at least one channel configuration selection is performed at each iteration of training of the network.

20. The computing system of claim 18, wherein bias is caused at least in part by a temperature parameter.

* * * * *